(12) United States Patent
Hong et al.

(10) Patent No.: US 11,949,062 B2
(45) Date of Patent: Apr. 2, 2024

(54) PRESSING JIG FOR REMOVING GAS TRAP AND METHOD FOR MANUFACTURING SECONDARY BATTERY USING SAME

(71) Applicant: LG ENERGY SOLUTION, LTD., Seoul (KR)

(72) Inventors: Suk Hyun Hong, Daejeon (KR); Joon Sung Bae, Daejeon (KR); Eui Kyung Lee, Daejeon (KR); Sang Jih Kim, Daejeon (KR); Beom Koon Lee, Daejeon (KR); Dong Hun Bae, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 37 days.

(21) Appl. No.: 17/630,946

(22) PCT Filed: Jan. 8, 2021

(86) PCT No.: PCT/KR2021/000228
§ 371 (c)(1),
(2) Date: Jan. 28, 2022

(87) PCT Pub. No.: WO2021/141427
PCT Pub. Date: Jul. 15, 2021

(65) Prior Publication Data
US 2022/0278352 A1    Sep. 1, 2022

(30) Foreign Application Priority Data

Jan. 10, 2020 (KR) .......................... 10-2020-0003780

(51) Int. Cl.
*H01M 50/30* (2021.01)
*H01M 10/04* (2006.01)
*H01M 50/317* (2021.01)

(52) U.S. Cl.
CPC ..... *H01M 10/0481* (2013.01); *H01M 50/317* (2021.01); *H01M 50/394* (2021.01)

(58) Field of Classification Search
CPC ............ H01M 10/048; H01M 10/046; H01M 50/317; H01M 50/394
See application file for complete search history.

(56) References Cited

U.S. PATENT DOCUMENTS

| 2015/0017542 A1* | 1/2015 | Hirai ................... H01M 4/5825 429/231.95 |
| 2018/0198111 A1 | 7/2018 | Hwang |

(Continued)

FOREIGN PATENT DOCUMENTS

| JP | 2003-181832 A | 7/2003 |
| JP | 2015-48309 A | 3/2015 |

(Continued)

OTHER PUBLICATIONS

International Search Report for PCT/KR2021/000228 dated Apr. 30, 2021.

(Continued)

*Primary Examiner* — Kenneth J Douyette
(74) *Attorney, Agent, or Firm* — Birch, Stewart, Kolasch & Birch, LLP

(57) ABSTRACT

A pressing jig for removing gas generated in an activation process of a battery cell includes a plate-shaped lower plate on which the battery cell that has undergone the activation process is placed and fixed, and an upper plate that presses the battery cell placed on the lower plate from above. At least one of the upper plate or the lower plate has a structure in which n (n≥3) separated sub-plates are assembled to form a single plate, and the sub-plates independently press the battery cell. The pressing jig can suppress trapping of internal gas by sequentially pressing the battery cell.

15 Claims, 10 Drawing Sheets

(56) References Cited

U.S. PATENT DOCUMENTS

| | | |
|---|---|---|
| 2018/0226673 A1 | 8/2018 | Bae et al. |
| 2019/0207183 A1 | 7/2019 | Park et al. |
| 2019/0207241 A1 | 7/2019 | Park et al. |
| 2019/0372147 A1 | 12/2019 | Matsumura et al. |
| 2019/0379083 A1 | 12/2019 | Jung et al. |

FOREIGN PATENT DOCUMENTS

| | | |
|---|---|---|
| JP | 2017-84508 A | 5/2017 |
| KR | 10-2012-0009661 A | 2/2012 |
| KR | 10-2013-0044776 A | 5/2013 |
| KR | 10-2015-0043754 A | 4/2015 |
| KR | 10-2015-0072019 A | 6/2015 |
| KR | 10-1558250 B1 | 10/2015 |
| KR | 10-1650858 B1 | 8/2016 |
| KR | 10-1713068 B1 | 3/2017 |
| KR | 10-2017-0118452 A | 10/2017 |
| KR | 10-1811474 B1 | 12/2017 |
| KR | 10-2018-0025804 A | 3/2018 |
| KR | 10-2018-0025805 A | 3/2018 |
| KR | 10-2018-0062839 A | 6/2018 |
| KR | 10-2018-0091255 A | 8/2018 |
| KR | 10-2018-0093321 A | 8/2018 |
| KR | 10-2018-0093792 A | 8/2018 |
| KR | 10-2018-0107859 A | 10/2018 |
| KR | 10-2004295 B1 | 7/2019 |

OTHER PUBLICATIONS

Extended European Search Report for European Application No. 21738846.1, dated Jan. 25, 2023.

Japanese Office Action for Japanese Application No. 2022-505548, dated Jan. 17, 2023, with English translation.

Chinese Office Action and Search Report for corresponding Chinese Application No. 202180004951.4, dated Aug. 3, 2023, with English explanation of relevance.

* cited by examiner

[FIG. 1]
CONVENTIONAL ART
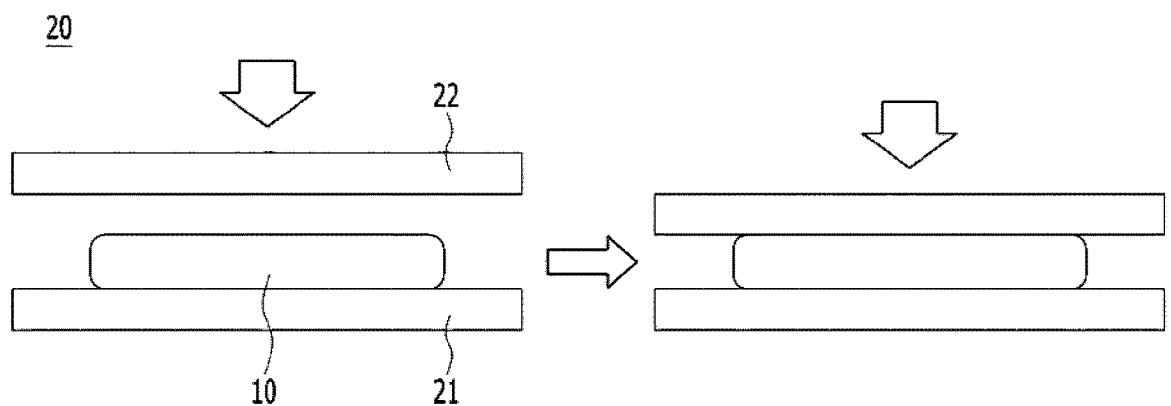

[FIG. 2]
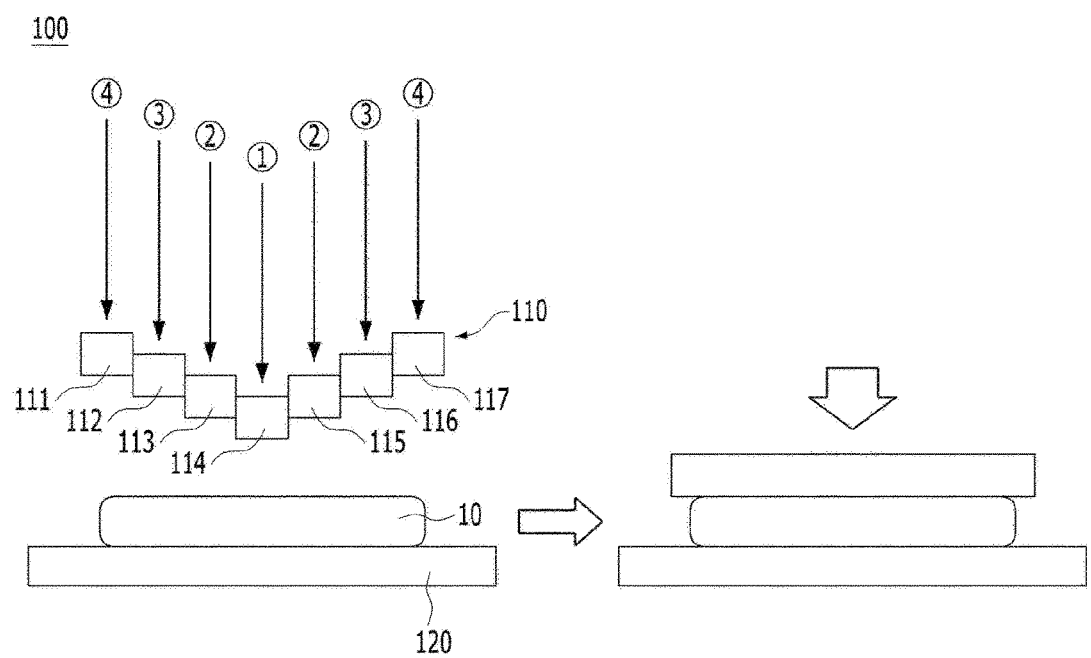

[FIG. 3]
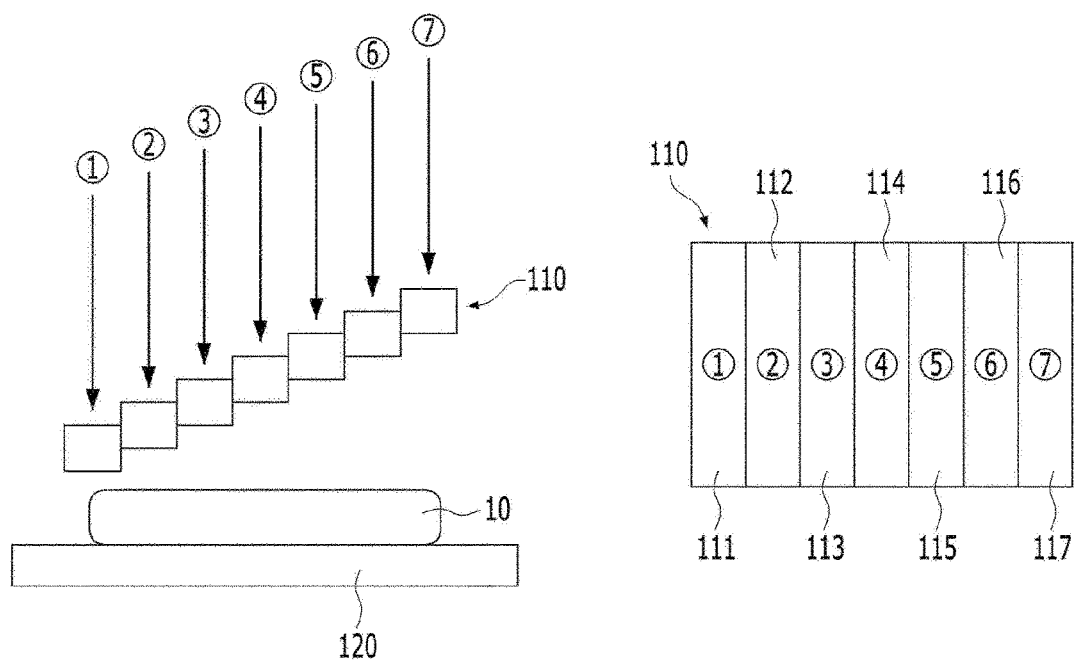

[FIG. 4]
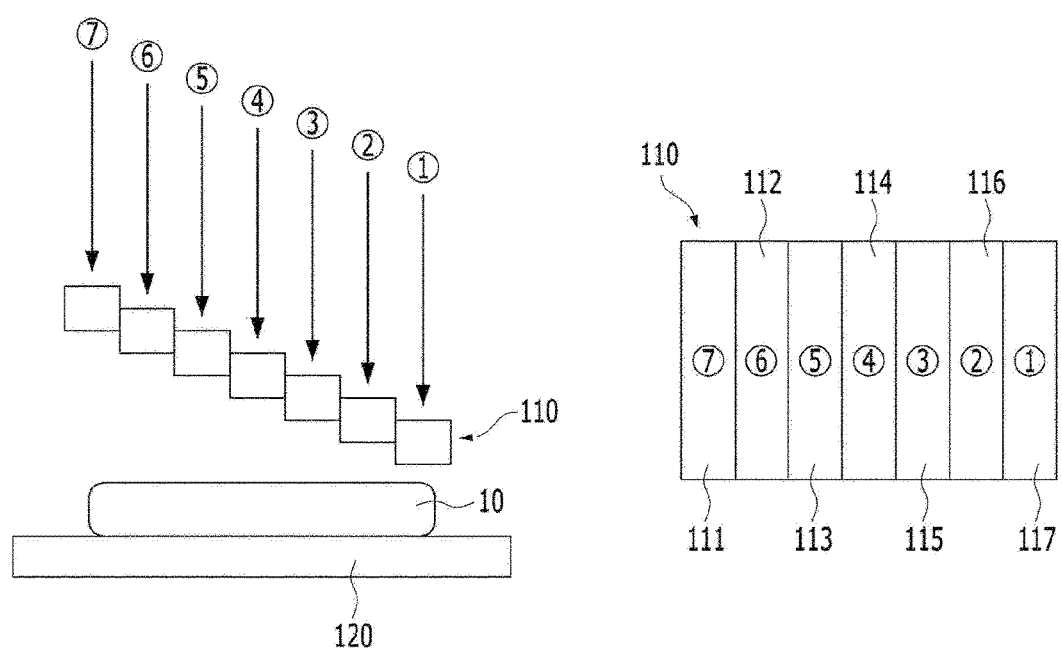

[FIG. 5]
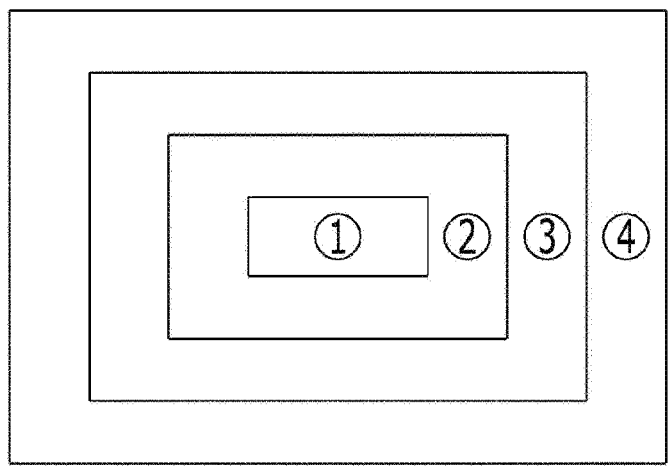

[FIG. 6]
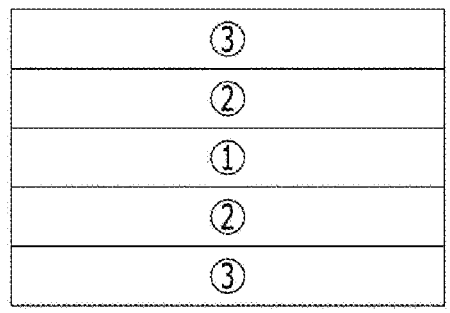
(a)
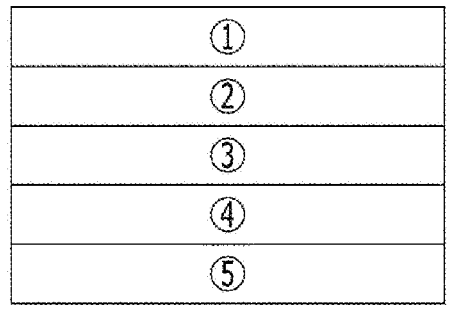
(b)
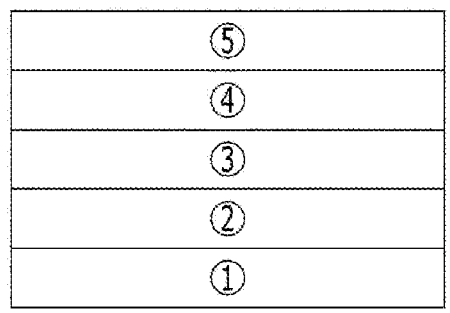
(c)

[FIG. 7]
110
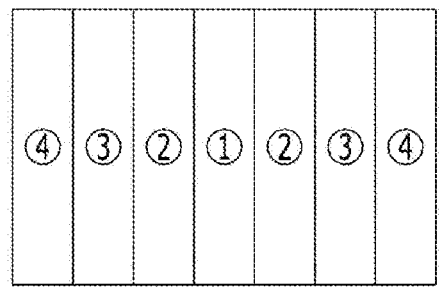
(a)
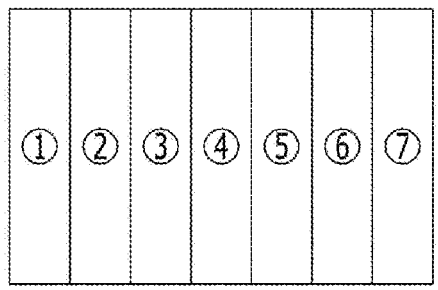
(b)
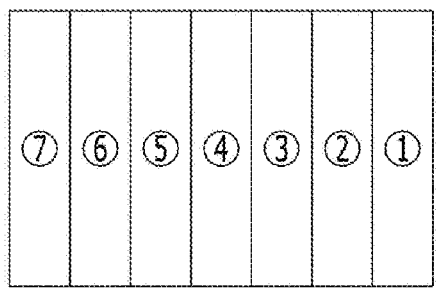
(c)

[FIG. 8]
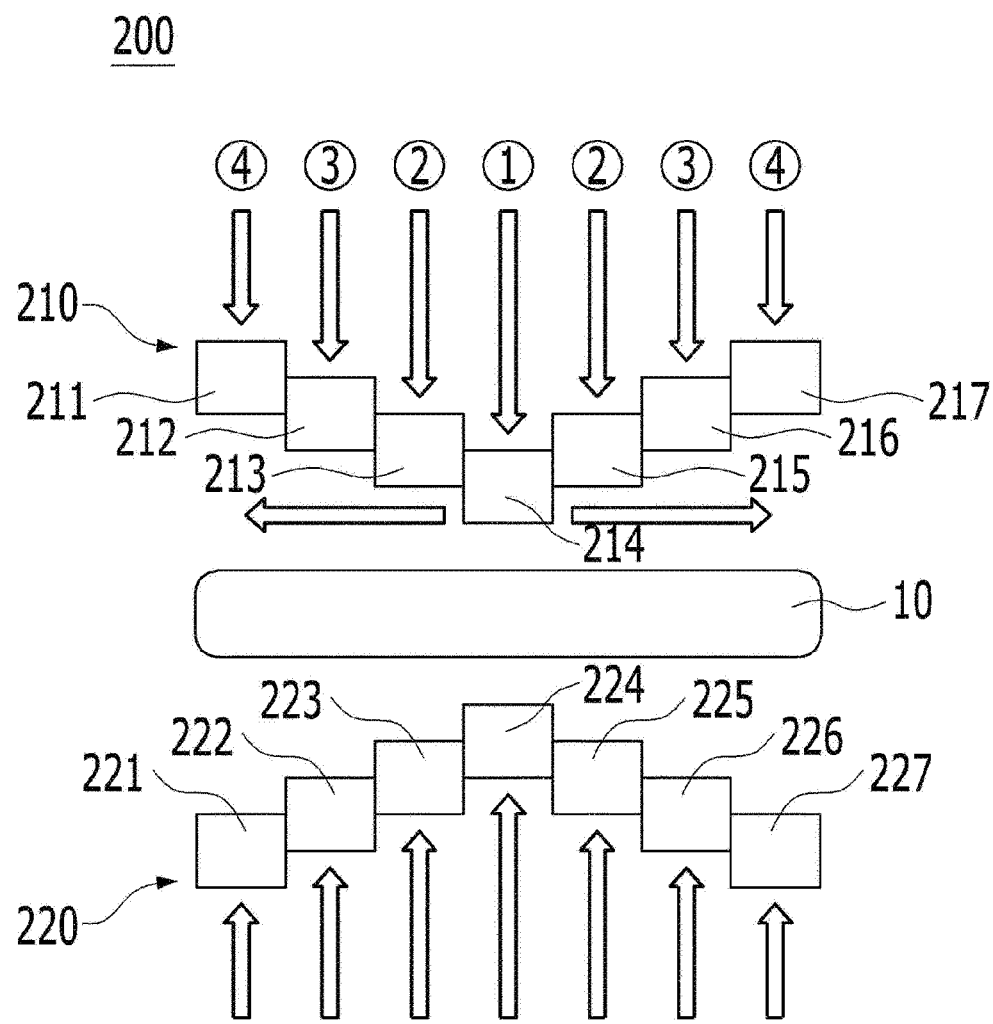

[FIG. 9]
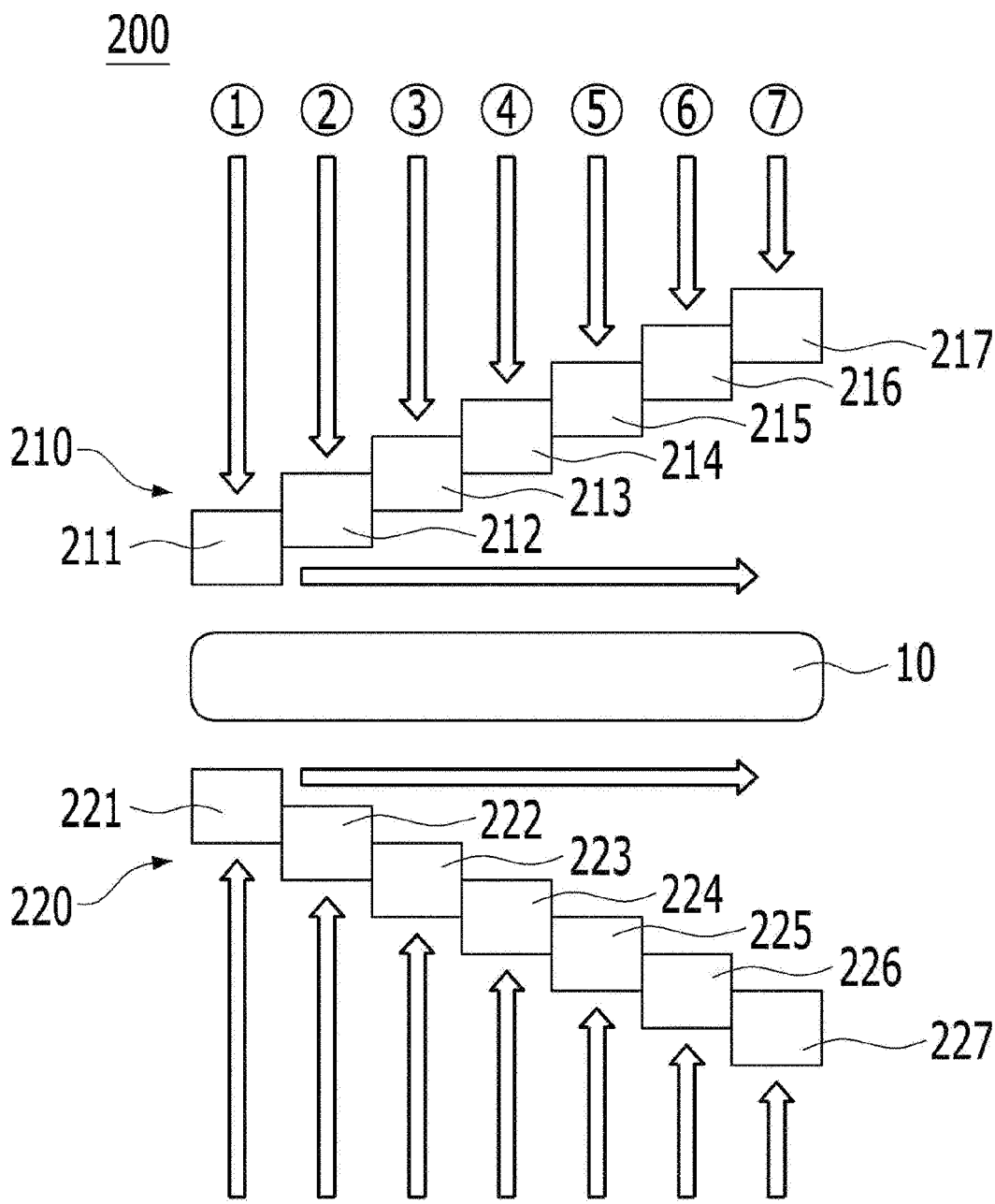

[FIG. 10]
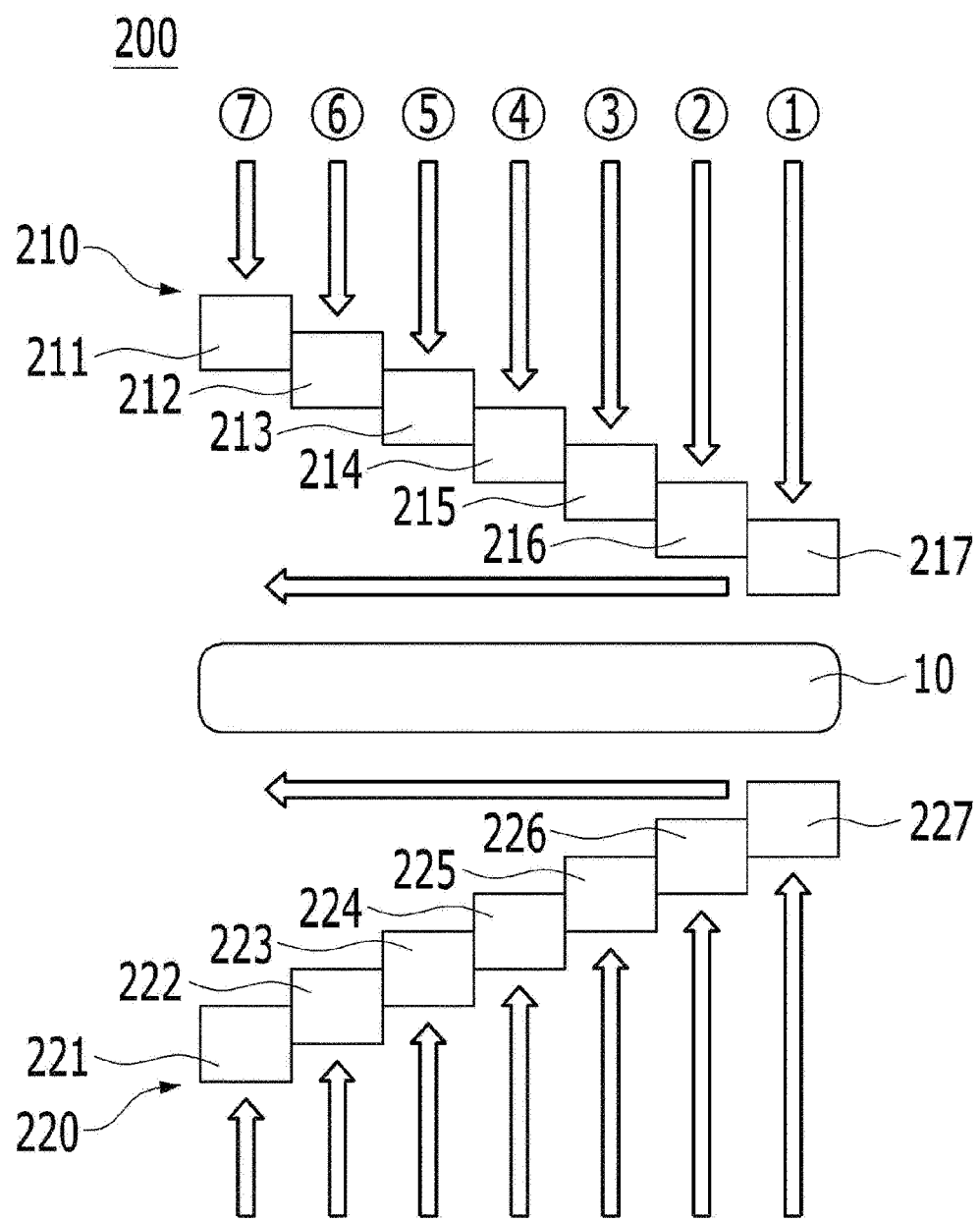

PRESSING JIG FOR REMOVING GAS TRAP AND METHOD FOR MANUFACTURING SECONDARY BATTERY USING SAME

TECHNICAL FIELD

This application claims the benefit of priority based on Korean Patent Application No. 10-2020-0003780, filed on Jan. 10, 2020, and the entire contents of the Korean patent application are incorporated herein by reference.

The present invention relates to a pressing jig for removing gas generated during an activation process, and a method for manufacturing a secondary battery using the same.

BACKGROUND ART

With the development of technology and demand for mobile devices, the demand for batteries as energy sources is rapidly increasing, and accordingly, a lot of researches on batteries capable of meeting various demands have been conducted.

Typically, in terms of the shape of the battery, there is a high demand for a prismatic secondary battery and a pouch-type secondary battery that can be applied to products such as mobile phones with a small thickness. In terms of materials, there is a high demand for lithium secondary batteries such as lithium ion batteries and lithium ion polymer batteries having advantages such as high energy density, discharge voltage, and output stability.

Further, secondary batteries are classified according to the structure of the electrode assembly having a positive electrode/separator/negative electrode structure. Representative examples thereof include a jelly-roll (wound) type electrode assembly in which long sheet type positive electrodes and negative electrodes are wound with a separator interposed therebetween, a stacked type electrode assembly in which a plurality of positive and negative electrodes cut in a predetermined size unit are sequentially stacked with a separator interposed therebetween, and a stacked/folded type electrode assembly in which bi-cells or full cells, in which positive and negative electrodes of a predetermined unit are stacked with a separator interposed therebetween, are wound.

In recent years, a pouch type battery having a stacked type or stacked/folded type electrode assembly embedded in a pouch-shaped battery case of an aluminum laminate sheet has attracted a lot of attention due to its low manufacturing cost and small weight, and the amount used thereof is gradually increasing.

Most of secondary batteries including such pouch-type batteries go through a process of activating batteries by charging/discharging during the processing of manufacturing battery cells. In order to manufacture final battery cells, gas generated during the activation process should be removed, which is called a degassing process.

According some conventional technologies, activated battery cells are fixed at a die and are simply pressed from the upper portion to remove gas. However, in this case, gas inside the battery cell corresponds to a fluid, and thus when there is pressure from the outer side, gas is dispersed in all directions without directionality. At this time, some of the gas is collected in the surplus portion for collecting gas, which is positioned at one side of the sealing unit of the battery cell, and is then removed. Some of the gas remains in the battery cell. This is called a gas trap, and such a gas trap has a danger of generating lithium precipitation during the following charging/discharging process.

FIG. 1 shows a conventional pressing jig. Referring to FIG. 1, the existing pressing jig 20 fixes a battery cell 10 on a plate-shaped die 21, and a plate-shaped upper plate 22 presses the battery cell from the upper portion. However, since the upper plate for pressing the battery cell presses the portion to be pressed of the battery cell at a time, gas is dispersed without directionality during the pressing process, and a gas trap, in which some gas remains inside the battery cell, occurs.

Korean Patent No. 1650858 discloses a degassing apparatus including a pressing jig having an arc shape that is downward-protruding on a vertical cross section. However, the pressing jig has an arc shape on a vertical cross-section, so that the pressed surface is not flat. As such, when the battery cell is pressed, it is difficult to apply constant pressure to the pressed portion. Further, the pressurization is only performed sequentially from the center toward the external side, and thus there are not many options of the pressing directions.

Therefore, there is a need for a technology for a pressing jig for solving the disadvantage.

DISCLOSURE

Technical Problem

Accordingly, the present invention has been devised to solve the above problems, and an object of the present invention is to provide a pressing jig for effectively removing internal gas generated during an activation process and preventing a gas trap.

It is also an object of the present invention to provide a pressing jig capable of granting various directionalities in sequentially pressing battery cells.

Technical Solution

The present invention for achieving the above object is a pressing jig having a pair of plates facing each other for pressing a battery cell after interposing the battery cell between the pair of plates to remove gas generated in an activation process of the battery cell, in which at least one of the pair of plates is provided as a combination of n separate subplates, the subplates each independently press the battery cell, and n is equal to or greater than 3.

In one example, the pair of plates comprise: a lower plate configured to support the battery cell at a lower portion of the battery cell; and an upper plate configured to press the battery cell at an upper portion of the battery cell, and the at least one of the pair of plates is only the upper plate, and the upper plate sequentially presses a top surface of the battery cell.

In another embodiment, the pair of plates include: a lower plate configured to press the battery cell from a lower portion of the battery cell; and an upper plate configured to press the battery cell at an upper portion of the battery cell, and the at least one of the pair of plates is both the upper plate and the lower plate, and the upper plate and the lower plate sequentially press both surfaces of the battery cell.

In one example, the subplates sequentially press the battery cell in one direction selected from a radial direction, a left and right direction, a left direction, a right direction, a vertical direction, an upward direction and a downward direction.

In one example, the lower plate includes a heating unit.

In one example, the subplates are consecutively set.

In one example, at least one of the plurality of subplates has a heating unit.

In one example, each of the subplates has a same volume, and the subplates form one upper plate.

In one example, each of the subplates has different volumes, and the subplates form one upper plate.

A method for manufacturing a secondary battery of the present invention includes: an activation step of activating the battery cell by charging and discharging the battery cell; and a pressing step of collecting gas generated during the activation step in a gas pocket by pressing the battery cell, wherein in the pressing step, the subplates sequentially press the battery cell in one direction selected from a radial direction, a left and right direction, a left direction, a right direction, a vertical direction, an upward direction and a downward direction.

In one example, the pressing step includes: a process of mounting the battery cell on the pressing jig; a first pressing process of pressing the battery cell by some of the subplates of the at least one of the pair of plates; and a second pressing process of sequentially pressing the battery cell by remaining subplates of the at least one of the pair of plates.

In one example, the subplates sequentially press one surface of the battery cell.

In one example, the subplates sequentially press both surfaces of the battery cell.

In one example, after the pressing step, the method for manufacturing the secondary battery of the present invention further includes: a perforation step of perforating a through hole connected to an inside of a battery case of the secondary battery to discharge the gas collected in the gas pocket to an outside; and a sealing step of sealing by heat fusion, after discharging the gas collected in the gas pocket through the through hole formed in the perforation step.

Advantageous Effects

According to a pressing jig and a method for manufacturing a secondary battery using the same according to the present invention, n separate subplates are assembled on the pressing surface of the pressing jig to thereby form one plate, thereby inducing sequential pressurization to the secondary battery and smooth discharge of gas.

BRIEF DESCRIPTION OF THE DRAWINGS

FIG. 1 is a diagram showing a conventional pressing jig.

FIG. 2 is a diagram illustrating a pressing jig and pressing method according to an embodiment of the present invention.

FIG. 3 is a view showing a pressing method according to another embodiment of the present invention.

FIG. 4 is a view showing a pressing method according to another embodiment of the present invention.

FIGS. 5 to 7 are diagrams illustrating a subplate according to an embodiment of the present invention.

FIGS. 8 to 10 are diagrams illustrating a pressing jig and pressing method according to another embodiment of the present invention.

DETAILED DESCRIPTION OF THE PREFERRED EMBODIMENTS

Hereinafter, preferred embodiments of the present invention will be described in detail with reference to the accompanying drawings. The terms and words used in the present specification and claims should not be construed as limited to ordinary or dictionary terms and the inventor may properly define the concept of the terms in order to best describe its invention. The terms and words should be construed as meaning and concept consistent with the technical idea of the present invention.

Accordingly, the embodiments described in the specification and the configurations described in the drawings are only the most preferred embodiments of the present invention, and do not represent all of the technical ideas of the present invention. It is to be understood that there may be various equivalents and variations in place of them at the time of filing the present application.

Also, throughout the specification, when an element is referred to as "including" an element, it is understood that the element may include other elements as well unless specifically stated otherwise.

FIG. 2 is a pressing jig according to an embodiment of the present invention. Referring to FIG. 2, the pressing jig 100 according to the present invention is a pressing jig for interposing a battery cell between one pair of facing plates and pressing the battery cell in order to remove gas generated during the activation process of the battery cell. At least one of the pair of plates 110 and 120 has a structure in which n (n≥3) separate subplates 111, 112, 113, 114, 115, 116 and 117 are assembled and form one plate 110, and each of the subplates independently presses the battery cell. Here, "n" is an integer of 3 or more, and specifically, it is an integer ranging from 3 to 20, 3 to 10 or 3 to 5.

Referring to FIG. 2, the one pair of plates include: a lower plate 120 configured to support a battery cell on a lower portion of the battery cell; and an upper plate 110 configured to press the battery cell from an upper portion of the battery cell. Herein, only the upper plate is formed by combination of subplates 111, 112, 113, 114, 115, 116 and 117 and has a structure of sequentially pressing only the top surface of the battery cell.

The pressing jig according to the present invention can partially or sequential press battery cells by applying a plate of a structure in which separate subplates are assembled. Thus, for example, by sequentially pressing the battery cell from the external side to the internal side, the internal gas may be more effectively discharged, and generation of the gas trap may be effectively prevented.

The subplates are consecutively set. The battery cell can be sequentially pressed by forming one plate by consecutive assembling. In the embodiment of FIG. 2, the first subplate 114 in the center first presses the battery cell. Thereafter, the second subplates 113 and 115 adjacent to the first subplate 114 secondly press the battery cell, the third subplates 112 and 116 thirdly press the battery cell, and then the fourth subplates 111 and 117 at the outermost portions finally press the battery cell. As the battery cell is pressed sequentially from the subplate in the center to the subplates at the outermost portions, the gas inside the battery cell comes to have a mobility from the center in the left direction and from the center in the right direction.

FIG. 3 is a diagram illustrating a pressing jig according to another embodiment. Referring to FIG. 3, the subplates 112, 113, 114, 115, 116 and 117 sequentially press the battery cell from the subplate 111 positioned at the leftmost side in the right direction. Hence, the gas inside the battery cell moves from the left to the right with directionality.

FIG. 4 is a diagram illustrating a pressing jig according to an embodiment of the present invention. Referring to FIG. 4, the subplates 112, 113, 114, 115, 116 and 117 sequentially press battery cell from the subplate 117 positioned at the rightmost side in the left direction. Hence, the gas inside the battery cell moves from the right to the left with directionality.

Referring to FIGS. 2 to 4, the volumes of the subplates are the same. Herein, the same volume means that the widths, the lengths and the thicknesses of the subplates are the same, and thus the shapes and the volumes of the subplates are the same. The upper plate consisting of the subplates of the same volume is illustrated in the embodiment, but it is not limited thereto. It can be appropriately selected whether the shapes and volumes of respective subplates are set to be the same according to the structural features and needs of the battery cell.

FIG. 5 shows a plate of a structure in which subplates are assembled according to an embodiment of the present invention. Referring to FIG. 5, the first subplate 111 in the center is plate-shaped, and the second subplate 112 to the fourth subplate 114 have a " " shape having a rectangular through hole in the center of a point of having a predetermined separation distance from the outer peripheral surface. The subplate has a structure in which first to fourth subplates sequentially press the battery cell, and the gas inside the battery cell moves in a rectangular shape with directionality by the sequential pressurization.

Herein, the subplates constituting the upper plate of the present invention sequentially press the battery cell in one direction selected from a radial direction, a left and right direction, a left direction, a right direction, a vertical direction, an upward direction and a downward direction.

FIGS. 8 to 10 illustrate a pressing jig 200 according to another embodiment of the present invention. Referring to FIGS. 8 to 10, the one pair of plates include: a lower plate 220 configured to press a battery cell on a lower portion of a battery cell; and an upper plate 210 configured to press the battery cell from an upper portion of the battery cell. Herein, both the upper plate and the lower plate are formed by combination of subplates 211, 212, 213, 214, 215, 216, 217, 221, 222, 223, 224, 225, 226 and 227 and have a structure of sequentially pressing both surfaces of the battery cell.

At this time, the subplates 214 and 224 in the center first press the battery cell. Thereafter, subplates 213, 215, 223 and 225 adjacent to the subplates in the center press the battery cell. Thereafter, subplates 212, 216, 222 and 226 adjacent to the subplates 213, 215, 223 and 225 press the battery cell. In this way, the battery cell is sequentially pressed. Accordingly, the inner gas is moved from the center in the left direction or the right direction. Further, as in FIG. 9, the subplates may sequentially press the battery cell from the left side in the right direction, and as in FIG. 10, the subplates may sequentially press the battery cell from the right side in the left direction.

In one specific example, the lower plate of the present invention may include a heating unit. The heating unit is a heater for applying heat to the battery cell. The heater may heat the battery cell to 30 to 100° C., and preferably to 40 to 80° C. When the heating temperature is less than 30° C., kinetic energy transmitted to gas is not large. Hence, it is difficult to expect significant effects in removing gas inside the battery cell, and when the heating temperature is greater than 100° C., the electrolyte solution in the battery cell may be decomposed or the battery case may be deformed.

In one specific example, the lower plate of the present invention can embed an exciter in the battery cell. The exciter has the advantage of delivering kinetic energy to the gas present in the battery cell, to thereby more effectively capture and remove the inner gas.

In one specific example, one or more of the subplates constituting the upper plate may include a heating unit. The battery cell can be pressed from both sides by including a heating unit in the upper plate in addition to the lower plate. As such, kinetic energy may be further transmitted to the internal gas in the battery cell, by which collection and removal of gas may be more effectively performed.

In one specific example, an elastic material may be added to at least a portion of the subplates, and specifically, an elastic material may be added to a portion in contact with at least a battery cell in the outer surface of the subplate. Excessive force is applied to a portion where the subplate contacts the battery cell while the subplates press the battery cell, and in some cases, the battery case may be broken. Therefore, it is desirable to distribute the force during contact of the subplate and the battery cell, and add an elastic material to the outer surface of the subplate to protect the battery case.

The elastic material may be at least one selected from the group consisting of, for example, polystyrene, polyurethane, silicon, epoxy and rubber resin, and may be a foaming material in another example.

In addition, the present invention provides a method for manufacturing a secondary battery using the pressing jig described above. Specifically, the pressing jig can be used to remove the internal gas in the battery cell that has completed the activation process. In one example, a method for manufacturing a secondary battery according to the present invention includes: an activation step (S100) of activating the battery cell by charging and discharging the battery cell; and a pressing step (S200) of collecting gas generated during the activation step by pressing the battery cell, in a gas pocket, wherein in the pressing step (S200), the subplates sequentially press the battery cell in one direction selected from a radial direction, a left and right direction, a left direction, a right direction, a vertical direction, an upward direction and a downward direction.

The activation step S100 is as follows. First, an electrode assembly is accommodated in a battery case, and electrolyte solution is injected. Thereafter, a solid electrolyte interface (SEI) layer is formed through electrochemical reaction between the electrode active material and the electrolyte solution by charging and discharging up to a predetermined SOC, to thereby activate the battery cell.

In the pressing step S200, in order to remove internal gas generated by electrochemical reaction of electrode active materials and electrolyte solution during the activation step, the battery cell is sequentially pressed, and the gas inside the battery cell is collected into a gas pocket. In the present invention, by sequentially pressing the battery cell in the pressing step S200, the internal gas is moved with directionality, thereby preventing a gas trap.

In one specific example, the pressing step (S200) includes: a process of mounting the battery cell on the pressing jig; a first pressing process of pressing the battery cell by some of the subplates; and a second pressing process of sequentially pressing the battery cell by remaining subplates.

At this time, subplates may sequentially press only one surface of the battery cell as in FIG. 2, and both surfaces of the battery cell may be sequentially pressed in as FIG. 8.

Referring to FIGS. 6 and 7, in one specific example, subplates have a structure of horizontally or vertically dividing one plate. FIG. 6(a) may be described as follows. First, the third subplate 113 in the center first presses the battery cell. Thereafter, the second subplate 112 and the fourth subplate 114 adjacent to the third subplate secondly press the battery cell. Finally, the first subplate 111 and the fifth subplate 115 at the outermost portion press the battery cell so that the gas in the battery cell may have directionality of moving in the upper direction and the lower direction. FIG. 6(b) shows an example that subplates sequentially press a battery cell from the upper portion in the lower direction, and FIG. 6(c) shows an example that subplates sequentially press a battery cell from the lower portion in the upper direction.

FIG. 7 shows an example in which one plate has horizontally divided subplates. FIG. 7(a) shows an example where subplates sequentially press a battery cell from the center in left and right directions. FIG. 7(b) shows an example where subplates sequentially press the battery cell from the left in the right direction. FIG. 7(c) shows an example where subplates sequentially press the battery cell from the right in the left direction.

Likewise, the plate constituting of the pressing jig of the present invention is modularized by a plurality of subplates. As such, according to the method for manufacturing a battery cell using the pressing jig of the present invention, when performing pressurization for gas removal, the battery cell may be sequentially pressed in one of vertical direction, upper direction, lower direction, horizontal direction, left direction, right direction and radial direction.

In one specific example, after the pressing step (S200), the method for manufacturing the secondary battery of the present invention further includes: a perforation step (S300) of perforating a through hole connected to an inside of a battery case to discharge the gas collected in the gas pocket to an outside; and a sealing step (S400) of sealing by heat fusion after discharging internal gas through the through hole formed in the perforation step.

In one specific example, the battery cell may be a pouch-type battery cell where an electrode assembly and electrolyte solution are contained in the battery case of a laminate sheet including a resin layer and a metal layer.

At this time, the laminate sheet may be an aluminum laminate sheet. Specifically, a resin outer layer having an excellent durability may be added to one surface (outer surface) of the metal blocking layer, and a heat melting resin sealant layer may be added to the other surface (inner surface) of the metal blocking layer.

Since the resin outer layer should have excellent resistance from the external environment, it is necessary to have a tensile strength and weather resistance of a predetermined level or more. In that aspect, polyethylene terephthalate (PET) and stretched nylon film may be used as the polymer resin of the resin outer layer.

Specifically, the metal blocking layer may be made of aluminum so that the metal blocking layer may perform the function of improving the strength of the battery case in addition to the function of preventing an inflow or leakage of foreign materials such as gas and moisture.

A polyolefin resin, which has thermal adhesion, a low hygroscopicity, and is not expanded or eroded by the electrolyte solution, may be preferably used as the polymer resin of the resin sealant layer. More specifically, non-stretched polypropylene (CPP) may be used.

In general, polyolefin resin, such as polypropylene, etc. is low in adhesion with metal. Hence, as a way to improve adhesion with the metal blocking layer, an adhesive layer may be further added between the metal layer and the resin sealant layer to thereby improve the adhesive force and blocking characteristics. The material of the adhesive layer may include, for example, a urethane material, an acryl material, a composition containing a thermoplastic elastomer, but not limited thereto.

Likewise, according to a pressing jig and a method for manufacturing a secondary battery using the same according to the present invention, n separate subplates are assembled on the pressing surface of the pressing jig to thereby form one plate, thereby inducing sequential pressurization to the secondary battery and smooth discharge of gas.

The invention claimed is:

1. A pressing jig comprising a pair of plates facing each other for pressing a battery cell after interposing the battery cell between the pair of plates to remove gas generated in an activation process of the battery cell,
   wherein at least one of the pair of plates is provided as a combination of n separate subplates,
   wherein the subplates each independently press the battery cell, and
   wherein n is equal to or greater than 3.

2. The pressing jig of claim 1, wherein the pair of plates comprise:
   a lower plate configured to support the battery cell at a lower portion of the battery cell; and
   an upper plate configured to press the battery cell at an upper portion of the battery cell, and
   wherein the at least one of the pair of plates is only the upper plate, and the upper plate sequentially presses a top surface of the battery cell.

3. The pressing jig of claim 1, wherein the pair of plates comprise:
   a lower plate configured to press the battery cell from a lower portion of the battery cell; and
   an upper plate configured to press the battery cell at an upper portion of the battery cell, and
   wherein the at least one of the pair of plates is both the upper plate and the lower plate, and the upper plate and lower plate sequentially press both surfaces of the battery cell.

4. The pressing jig of claim 1, wherein the subplates sequentially press the battery cell in one direction selected from a radial direction, a left and right direction, a left direction, a right direction, a vertical direction, an upward direction and a downward direction.

5. The pressing jig of claim 2, wherein the lower plate includes a heating unit.

6. The pressing jig of claim 1, wherein the subplates are consecutively set.

7. The pressing jig of claim 1, wherein at least one of the plurality of subplates has a heating unit.

8. The pressing jig of claim 1, wherein each of the subplates has a same volume, and the subplates form one upper plate.

9. The pressing jig of claim 1, wherein each of the subplates has different volumes, and the subplates form one upper plate.

10. The pressing jig of claim 1, wherein the subplates are arranged in a first direction, and
    wherein the subplates are configured to move independently in a second direction perpendicular to the first direction to individually press the battery cell.

11. A method for manufacturing a secondary battery including a pressing step for removing gas by using the pressing jig of claim 1, the method comprising:
    an activation step of activating the battery cell by charging and discharging the battery cell; and a pressing step of collecting gas generated during the activation step in a gas pocket by pressing the battery cell, wherein, in the pressing step, the subplates sequentially press the battery cell in one direction selected from a radial direction, a left and right direction, a left direction, a right direction, a vertical direction, an upward direction and a downward direction.

12. The method of claim 11, wherein the pressing step comprises:
a process of mounting the battery cell on the pressing jig;
a first pressing process of pressing the battery cell by some of the subplates of the at least one of the pair of plates; and
a second pressing process of sequentially pressing the battery cell by remaining subplates of the at least one of the pair of plates.

13. The method of claim 11, wherein the subplates sequentially press one surface of the battery cell.

14. The method of claim 11, wherein the subplates sequentially press both surfaces of the battery cell.

15. The method of claim 11, further comprising, after the pressing step:
a perforation step of perforating a through hole connected to an inside of a battery case of the secondary battery to discharge the gas collected in the gas pocket to an outside; and
a sealing step of sealing, by heat fusion, after discharging the gas collected in the gas pocket through the through hole formed in the perforation step.

* * * * *